United States Patent [19]

Nyberg

[11] 4,168,192

[45] Sep. 18, 1979

[54] PROCESS FOR MAKING RECOVERABLE TUBULAR ARTICLE

[75] Inventor: David D. Nyberg, Sunnyvale, Calif.

[73] Assignee: Raychem Corporation, Menlo Park, Calif.

[21] Appl. No.: 805,533

[22] Filed: Jun. 10, 1977

Related U.S. Application Data

[62] Division of Ser. No. 285,567, Sep. 1, 1972, Pat. No. 4,035,534.

[51] Int. Cl.² .............................................. B32B 31/00
[52] U.S. Cl. .............................. 156/86; 174/DIG. 8; 428/36; 428/913
[58] Field of Search .......... 174/73 R, 73 SC, DIG. 8, 174/74 A; 156/84, 85, 86, 344; 138/140, 119, 95, 96 R, 89, DIG. 5; 428/36, 516, 913, 35, 212, 43; 285/381; 403/28, 29, 30, 273

[56] References Cited

U.S. PATENT DOCUMENTS

| 3,243,211 | 3/1966 | Wetmore | 174/DIG. 8 |
| 3,382,121 | 5/1968 | Sherlock | 156/86 |
| 3,396,460 | 8/1968 | Wetmore | 174/DIG. 8 |
| 3,415,287 | 12/1968 | Heslop et al. | 174/DIG. 8 |
| 3,582,457 | 6/1971 | Barthell | 174/DIG. 8 |
| 3,597,372 | 8/1971 | Cook | 264/230 |
| 3,669,824 | 6/1972 | Hess | 428/212 |
| 3,717,717 | 2/1973 | Cunningham | 174/73 R |

Primary Examiner—William R. Dixon, Jr.
Attorney, Agent, or Firm—Lyon & Lyon

[57] ABSTRACT

An article such as a tube formed of heat-shrinkable material is bonded exteriorly or interiorly to an elastomeric member to form a laminated article. The bonding preferably takes place before heating and expanding of the heat-shrinkable tube. After expansion and cooling, the parts remain in the heat recoverable position. Subsequent heating of the parts causes them to recover radially about a substrate.

24 Claims, 12 Drawing Figures

PROCESS FOR MAKING RECOVERABLE TUBULAR ARTICLE

This is a division of application Ser. No. 285,567, filed Sept. 1, 1972 now U.S. Pat. No. 4,035,534.

This invention relates to heat-shrinkable items of two-part construction. One of the parts is formed of heat-shrinkable material possessing elastic memory or plastic memory properties. The other part is formed of soft, flexible rubber or other rubber-like material not necessarily heat-shrinkable but possessing desirable physical or chemical properties. One part is laminated to the other in a tube or molded part configuration.

Because of the negligible crystallinity of very low modulus rubber, it is not possible to obtain a single component heat-shrinkable part of low hardness, for example below about 30 Shore A, with conventional techniques. The heat-shrinkable component possessing the property of elastic memory can be either an inner core or an outer shell, and the other component is formed around or inside the heat-shrinkable part. Good adhesion of the two components may be required, and thus an adhesive or coupling agent may be required at the interface.

A composite tubular member having an outer layer of material not necessarily heat-shrinkable is useful when the outer layer should be quite soft, relatively thick (e.g., more than about ⅛″ in thickness), or have other characteristics, such as electrical insulation improved weathering to oxygen, light or ozone, etc., improved resistance to chemicals such as solvents or better tear strength or abrasion resistance. Where the heat-shrinkable component comprises an outer shell, the other component or layer of the tubular member may be chosen on the basis of desired physical or chemical properties for example, those mentioned above.

Various heat recoverable materials, which possess sufficient rigidity to hold out the elastomeric layer, are well known to those skilled in the art and may be used in this invention for the heat recoverable layer. Suitable heat recoverable materials are thermoplastic polymers which have been crosslinked, or which inherently possess the property of heat recoverability.

Examples of desirable thermoplastic polymers which have been crosslinked or which inherently possess the property of heat recoverability are polyolefins, such as polyethylene, ethylene-vinyl acetate copolymer, ethylene-ethyl acrylate copolymer or other ethylene copolymers, polyvinylidine diflouride, polyvinyl chloride, etc. Also, elastomeric thermoplastic materials such as those described in U.S. Pat. No. 3,597,372, the disclosure of which is incorporated herein by reference, may be used.

Additional compounds which may be used are various thermoplastic elastomers known as elastoplastics such as thermoplastic polyurethanes, polymers marketed by Shell under the mark KRATON which are styrene-butadiene-styrene and styrene-isoprene-styrene block copolymers, polyester-polyether copolymers, silicone-carbonate and silicone-styrene block copolymers, graft copolymers such as the natural rubber-methyl methacrylate graft copolymer sold under the trade name HEVEA PLUS, etc.

Additionally, other flexible polymers possessing necessary crystallinity such as ethylene-propylene-diene terpolymers, trans-polybutadiene and trans-polyisoprene may be used. In addition, various commercially available elastomer-thermoplastic blends such as nitrile rubber-PVC and nitrile rubber-ABS may be employed.

Although the terms "heat-recoverable" or "heat-shrinkable" are used in this specification, it should be understood that suitable thermoplastic material, e.g. a glassy or crystalline linear polymer, not necesarily heat-recoverable, may be used in essentially the same manner as the heat-recoverable sleeve. It is only necessary that said thermoplastic material, used in place of the heat-recoverable material, have sufficient rigidity at storage temperatures to hold the elastomeric sleeve in the desired stretched position. Such a thermoplastic material sleeve could be bonded to the elastomeric sleeve on either the inside or outside, by molding it in place or by placing concentric sleeves of thermoplastic material and relaxed elastomeric material in contact with each other and bonding them at the interface.

For the elastomeric layer, virtually any desired material possessing elastomeric properties may be used. Suitable elastomers include rubber or rubber-like material such as natural rubber, cis-polyisoprene, cis-polybutadiene, styrene-butadiene rubber (SBR), butadiene-acrylonitrile rubber, polychloroprene (Neoprene), butyl rubber, polysulfide, silicone rubber, urethane rubber, polyacrylate, epichlorohydrin homo- and copolymers, propylene oxide rubber, fluorosilicone rubber, fluorohydrocarbon rubber, chlorosulfonated polyethylene, chlorinated polyethylene and nitroso rubber. In addition, highly plasticized thermoplastic such as PVC plastisol may be useful in some embodiments.

It is generally desirable that the two layers be bonded to each other, although it is not necessary in all cases. Thus, if the heat recoverable layer is the inner layer, for example, the external rubber layer may adhere tightly enough to it by virtue of its tendency to contract down onto the heat recoverable layer. In other applications and where the elastomeric material is the inner layer, a stronger bond may be desired. A bond can be achieved by various means available to those skilled in the art. Thus, any suitable adhesive may be used to bond the heat recoverable and elastomeric layers. Exemplary of such adhesives are peroxides, either organic or silyl, which form crosslinks between the two layers; laminating adhesives, such as polyesters, polyurethanes, etc.; structural adhesives such as epoxies, nitrile rubber, phenolics, cyanoacrylics, etc.; hot melt adhesives of suitable bond strength and softening temperatures, such as polyamides and various rubber-based adhesives such as those based on silicone nitrile and neoprene.

It may be desired to fuse or weld the two layers together without use of an adhesive. Such bonding may be achieved simply by heating the layers to a high enough temperature at their interface so that they become flowable and then applying sufficient pressure to achieve a fusing or welding of the layers.

This invention provides a heat recoverable elastomeric sleeve having a thickness and properties not previously obtainable. In making the sleeve it is normally desirable that the elastomeric portion of the sleeve be in the stretched condition when the sleeve is in its recoverable state. Thus the elastomeric portion is normally bonded to the heat recoverable sleeve when that sleeve is in its recovered or heat stable condition. It is, of course, possible to stretch the elastomeric sleeve and bond it to an expanded heat recoverable sleeve but such a process is often more difficult.

In the drawings:

FIG. 1 shows an inner tube of heat-recoverable material bonded on its outer surface to a rubber tube having desirable physical or chemical properties.

FIG. 2 shows the tubes after heating and expansion on a mandrel.

FIG. 3 shows the tubes after cooling and after withdrawing the mandrel.

FIG. 4 shows the tubes after heating of at least the heat-shrinkable tube to cause it to shrink upon a central support member.

Figure 1:
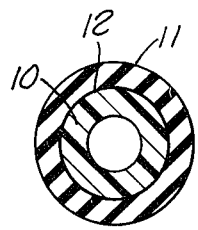
FIGS. 1-4 are transverse sectional views showing steps in a process for heat-shrinking laminated tubes onto a support member, the heat-shrinkable tube lying inside the elastomeric tube.
Figure 2:
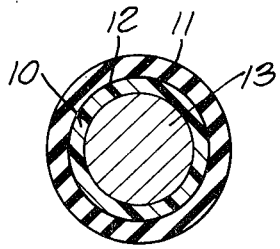
Figure 3:
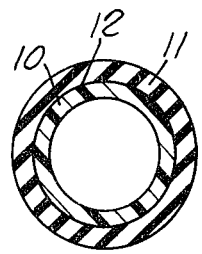
Figure 4:
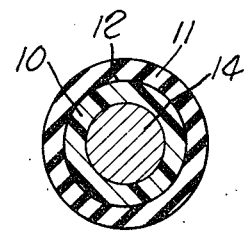
Figure 5:
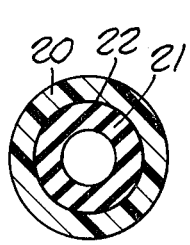
FIGS. 5-8 are transverse sectional views showing steps in a process for heat-shrinking laminated tubes onto a support member, the heat-shrinkable tube lying outside the inner tube.

Referring to the drawings, the heat-shrinkable tube 10 shown in FIG. 1 is enclosed by the outer tube 11 and connected by means of a bond such as an adhesive bond 12 joining the outer surface of the tube 10 to the inner surface of the tube 11. Although the bond is referred to as an adhesive bond in describing the drawings, it should be understood that any type of bond may be employed. The tubes are heated and expanded to the position shown in FIG. 2 in which the inner tube 10 is expanded on the mandrel 13, the adhesive bond 12 between the tubes 10 and 11 remaining undisturbed. FIG. 3 shows the tubes 10 and 11 after cooling and after withdrawal of the mandrel 13. The bond 12 is still intact. FIG. 4 shows the final position of the parts after the application of heat to cause the heat-shrinkable tube 10 to shrink down and grip substrate member 14. The bond 12 remains intact between the tubes 10 and 11. A rubber-tired roller is an example of the final product shown in FIG. 4.

Figure 6:
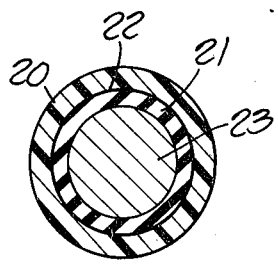
Figure 7:
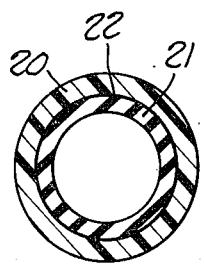
Figure 8:
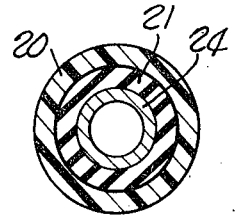

The process shown in FIGS. 5-8 is similar to that of FIGS. 1-4 except that the heat-recoverable tube 20 is on the outside and encircles the elastomeric tube 21. The tubes may be bonded by initially expanding heat recoverable tube 20 and then heat to recover it down onto elastomeric tube 21. An adhesive bond 22 may join the outer surface of the elastomeric tube 21 to the inner surface of the outer tube 20. FIG. 6 shows the parts after heating and expanding on the mandrel 23, the adhesive bond 22 between the tubes 20 and 21 remaining intact. FIG. 7 shows the position of the parts after cooling and withdrawal of the mandrel. The adhesive bond 22 prevents the elastomeric tube 21 from shrinking away from the heat-shrinkable tube 20. FIG. 8 shows the position of the parts after the application of heat which causes the tube 20 to shrink. As a result, elastomeric tube 21 will contract about a cylindrical substrate 24 and the recovery of tube 20 will farther compress tube 21 about the substrate 24. The laminated tube assembly of FIG. 8 when shrunk in position around the cylindrical substrate could be used to prevent leakage between ends of two pipes butted together, and the composition of the inner tube 21 might be chosen for its chemical properties in resisting attack by fluids carried in the pipes.

Figure 9:
FIGS. 9-12 are transverse sectional views showing steps in a process which produces an article similar to that shown in FIG. 4 but wherein the stretched outer elastomeric tube is bonded to the heat-recoverable tube after the expansion of the latter.
Figure 10:
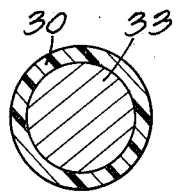
Figure 11:
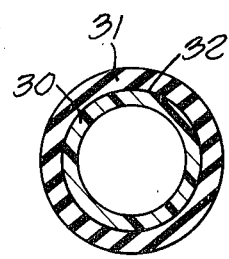
Figure 12:
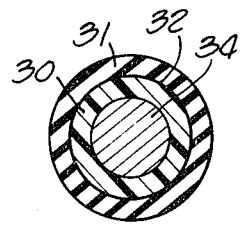

The process shown by FIGS. 9-12 produces a product which is similar to that produced by the process of FIGS. 1-4. As shown in FIG. 9, the heat-shrinkable tube 30 is the only one involved at the time of the initial heating and expanding step. Thus, as shown in FIG. 10, the heat-shrinkable tube 30 encircles the expanding mandrel 33. Either before or after the cooling step, the elastomeric tube 31 is installed, the inner surface of the elastomeric tube 31 being bonded at 32 to the outer surface of the expanded heat-shrinkable tube 30. Generally, it will be necessary that the elastomeric tube 31 be stretched from its normal diameter shown in FIG. 12 to a diameter large enough to slip over the recoverable sleeve of expanded diameter as shown in FIG. 11. FIG. 11 shows the position of the parts after cooling and after withdrawal of the mandrel 33. Upon heating, the inner tube 30 contracts around the metallic support member 34, and the elastomeric tube 31 contracts as well to its normal diameter.

The present invention is applicable to a wide variety of uses. When the elastomeric sleeve is on the outside, the invention may be used as a roller, tire, etc., which may be shrunk onto a wheel or other substrate. Further the structure may be used as an insulating or protective coating where an elastomeric outer surface is desired. When the outer surface is elastomeric, the inner surface may be coated with a suitable adhesive.

The sleeve, when the elastomeric layer is on the inside, may be used to cover electrical joints. The elastomeric layer would normally comprise an insulating material. However, a portion of the inner layer may be made semiconductive by inclusion of conductive particles such as carbon black or metal particles in the layer. Further, the inner surface of the elastomeric may be semiconductive while the remainder of the layer is kept insulating. Thus, in FIG. 8, if substrate 24 were a conductor, the portion of layer 21 closest to 24 might be semiconductive for stress grading termination and splices for high voltage applications. The semiconductive material may be in either layer for stress grading. It may be placed in the heat recoverable layer to provide for shrinking by resistance heating.

The invention can be further understood by reference to the following examples:

EXAMPLE I

A roller having a heat recoverable inner core and a soft outer surface was prepared using a cylindrical mold. A heat recoverable tubing of polyethylene was recovered onto the core of the mold which was 2.5 inches in diameter. Into the remaining anular cavity was poured a mixture whose primary component was a liquid ester-type polyurethane polymer sold by Thiokol under the trade name SOLITHANE 291. The mixture was prepared by preheating (400 g) SOLITHANE to 185° F. and then a plasticizer, dipropylene glycol dibenzoate (80 g) sold under the trade name BENZOFLEX-88 was blended into the SOLITHANE followed by trimethylolpropane (10.12 g) and triisopropanolamine (4.8 g) as curing agents to chain extend and cross-link the polyurethane. The mixture was heated under vacuum at 155° F. to degas before pouring into the mold. Curing for 1 hour at 300° F. was performed. On subsequent heating expansion and cooling the resulting laminate was heat recoverable and had a soft outer surface.

EXAMPLE II

A stress cone for covering electrical connections can be fabricated as follows: A low modulus elastomeric sleeve is formed by molding ethylene-propylene-diene monomer terpolymer (EPDM) into a soft rubber cone or sleeve. This sleeve has an internal diameter slightly smaller than the outer diameter of the connection which it is to cover when the sleeve is in the relaxed state. An outer sleeve of heat recoverable, low density polyethylene is separately molded. The polyethylene sleeve is then expanded using a heated mandrel. The inner surface of the heat recoverable sleeve and the outer surface of the elastomeric sleeve is then cleaned. An adhesive containing 47.5% ethylene-vinyl acetate-carboxylic acid terpolymer sold under the trade name of ELVAX 260 and 47.5% of ethylene-ethyl acrylate copolymer sold under the trade name DPD 6169 and 5% reinforcing carbon block is used to bond the two sleeves. The heat recoverable sleeve is placed over the elastomeric sleeve and shrunk around the elastomeric sleeve at about 175° C. applied for five minutes. Finally, the laminated structure is expanded immediately after shrinkage and while still hot with a mandrel to give the desired inner diameter of the elastomeric sleeve. The sleeve can then be placed over a joint in two conductors and shrunk down in place.

From the foregoing, it can be seen that the invention has many forms and applications. It should be understood that the invention is not limited to the specific examples but rather, is limited only by the scope of the appended claims.

I claim:

1. The process comprising the following steps: bonding the outer surface of an inner tube to the inner surface of an outer coaxial tube, one of the tubes being formed of elastomeric material and the other tube being formed of a thermoplastic material and being capable of maintaining the elastomeric tube in a stretched configuration, heating and expanding the bonded tubes radially, cooling the tubes while expanded whereby the expanded tube of thermoplastic material maintains the elastomeric tube in its expanded condition, and subsequently heating at least the tube formed of thermoplastic material to cause the bonded tubes to contract and to cause the inner tube to grip the outer surface of a support member, without destroying the bond between the tubes.

2. The process of claim 1 in which a mandrel is used in the expanding step and wherein the mandrel is withdrawn from the bonded tubes following the cooling step.

3. The process comprising the following steps:
   (a) radially expanding an elastomeric tube,
   (b) bonding the outer surface of said radially expanded elastomeric tube to the inner surface of a coaxially arranged second tube of crosslinked thermoplastic polymeric material, said outer tube being capable of maintaining the elastomeric tube in its radially expanded condition until heated above the melting point of the polymeric material.

4. The process according to claim 3 wherein the elastomeric tube is adhesively bonded to the second tube.

5. The process according to claim 4 wherein the elastomeric tube is radially expanded using a mandrel.

6. The process according to claim 3 wherein the second tube is heated above the melting point of the polymeric material to allow the elastomeric tube to radially contract and engage the surface of a support member.

7. The process comprising the following steps:
   (a) bonding the outer surface of an inner tube to the inner surface of an outer coaxial tube, the inner tube being formed of an elastomeric material and the outer tube being formed of heat-recoverable material and being in its heat stable state;
   (b) heating and radially expanding the bonded tubes to convert the outer tube to its heat recoverable state;
   (c) cooling the tubes while expanded such that the outer heat recoverable tube maintains the inner tube in its radially expanded condition;
   (d) heating at least the outer tube to cause the bonded tubes to contract and to cause the inner tube to shrink tightly about the outer surface of a support member without destroying the bond between the tubes.

8. The process of claim 7 wherein the inner tube has substantially greater thickness than the outer tube.

9. A process according to claim 7 wherein a mandrel is inserted in the inner tube to expand the tubes.

10. A process according to claim 7 wherein the tubes are bonded by an adhesive.

11. The process comprising the following steps:
    (a) bonding the outer surface of an inner tube to the inner surface of an outer coaxial tube, the inner tube being formed of heat recoverable material and being in its heat stable state and the outer tube being formed of elastomeric material;
    (b) heating and radially expanding the bonded tubes to convert the inner tube to its heat recoverable state;
    (c) cooling the tubes while expanded such that the inner heat recoverable tube maintains the outer tube in its radially expanded condition;
    (d) heating at least the inner tube to cause the bonded tubes to contract and to cause the inner tube to shrink tightly about the outer surface of a support member without destroying the bond between the tubes.

12. A process according to claim 11 wherein a mandrel is inserted in the inner tube to expand the tubes.

13. A process according to claim 11 wherein the tubes are bonded by an adhesive.

14. The process comprising the following steps:
    (a) heating a tube of heat recoverable material, the tube being in its heat stable state;
    (b) radially expanding the tube to its heat recoverable state;
    (c) bonding a surface of the heat recoverable tube to a surface of a radially expanded concentric tube of elastomeric material to maintain the tube of elastomeric material in its radially expanded condition.

15. The process of claim 14 in which the tube of heat recoverable material is cooled after bonding.

16. The process of claim 14 in which the tube of heat recoverable material is cooled prior to bonding.

17. The process of claim 14 in which the inner surface of the tube of heat recoverable material is bonded to the outer surface of the tube of elastomeric material.

18. The process of claim 14 in which the outer surface of the tube of heat recoverable material is bonded to the inner surface of the tube of elastomeric material.

19. The process comprising the following steps:

(a) placing a tube formed of heat recoverable material, the tube being in its heat stable state, in a mold cavity;
(b) surrounding the outer surface of said tube with a second material capable of transformation to an elastomer upon the application of heat;
(c) heating the mold cavity to transform the second material to an elastomeric member surrounding said tube and bonded thereto;
(d) radially expanding said tube and said elastomeric member while hot; and
(e) cooling said tube and said elastomeric member while expanded to impart heat recoverability to said tube whereby said elastomeric member is maintained in its expanded condition by said heat recoverable tube.

20. The process of claim 19 wherein the outer surface of the tube of heat recoverable material is coated with an adhesive which bonds the elastomeric member to the tube.

21. The process comprising the following steps:
(a) radially expanding an elastomeric tube; and
(b) bonding the outer surface of said elastomeric tube while radially expanded to the inner surface of a coaxially arranged second tube of polymeric material, said second tube being capable of maintaining the elastomeric tube in its radially expanded condition at storage temperature.

22. The process of claim 21 wherein the outer tube is formed of a polymer selected from crystalline and glassy polymers.

23. The process of claim 21 wherein the elastomeric tube is adhesively bonded to the second tube.

24. The process of claim 21 wherein the elastomeric tube is radially expanded using a mandrel.

* * * * *